June 24, 1930.  J. H. HUFFMAN  1,767,365
TIRE RIM TOOL
Filed Oct. 8, 1929
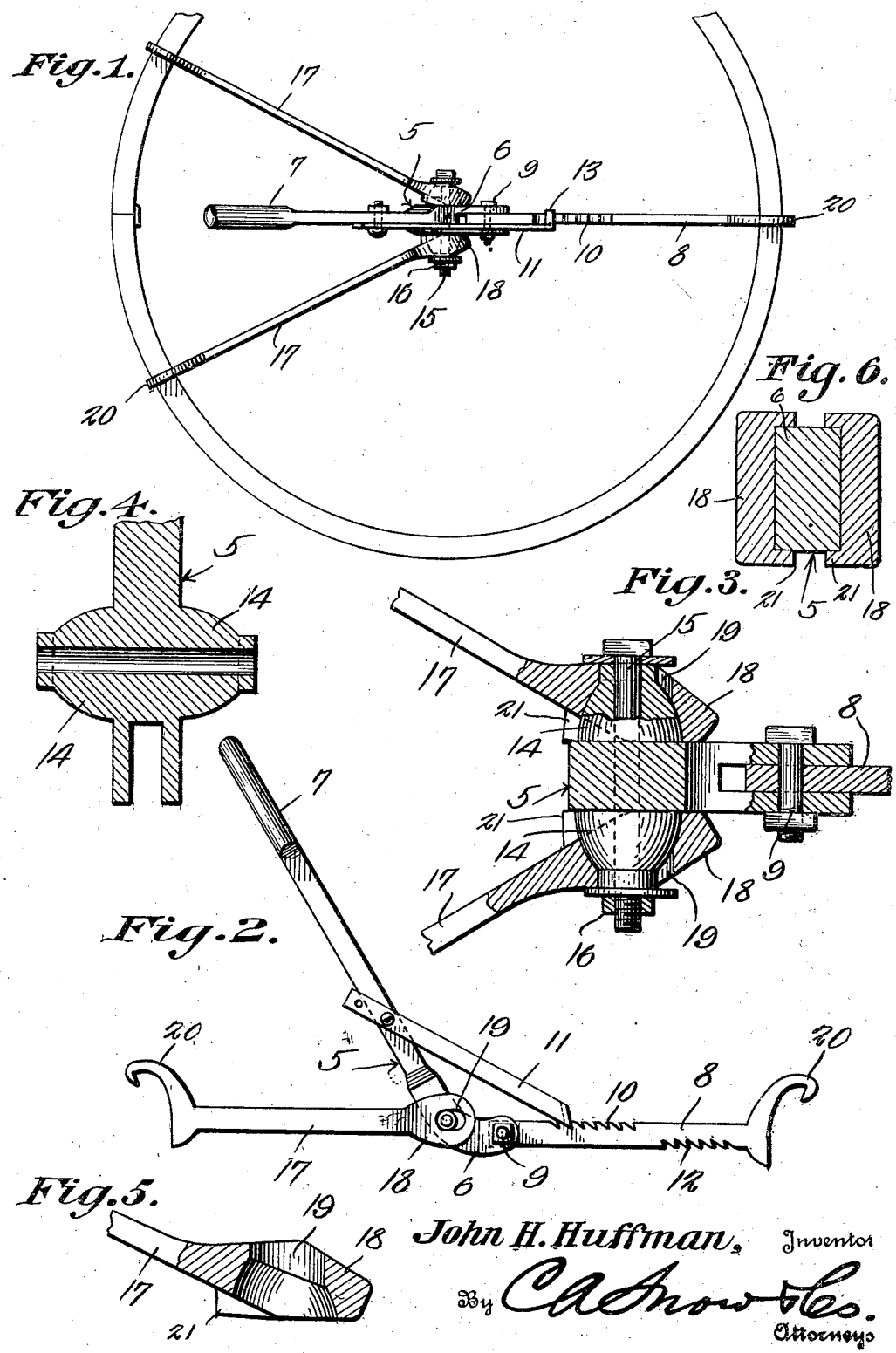
John H. Huffman, Inventor Patented June 24, 1930

1,767,365

UNITED STATES PATENT OFFICE

JOHN H. HUFFMAN, OF WASHINGTON, DISTRICT OF COLUMBIA

TIRE-RIM TOOL

Application filed October 8, 1929. Serial No. 398,209.

The present invention relates to a tire rim tool, the primary object of the invention being to provide a rim tool which may be readily and easily positioned on a rim, or removed therefrom.

An important object of the invention is to provide a tool of this character wherein the laterally movable arms thereof are supported by the main bolt of the tool, thereby greatly increasing the strength of the tool over the well known tire rim tool of this character wherein the laterally movable arms are connected by bolts other than the main bolt of the tool.

Another object of the invention is the provision of substantially large bearing members for the laterally movable arms, to permit the laterally movable arms to move freely to automatically adjust themselves to the work.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a plan view of a tool constructed in accordance with the invention.

Figure 2 is a side elevational view of the tool.

Figure 3 is a sectional view through the body portion of the tool illustrating the connection between the body portion and laterally movable arms.

Figure 4 is a sectional view through the body portion.

Figure 5 is a fragmental sectional view of one of the movable arms.

Figure 6 is a sectional view through the device when folded.

Referring to the drawing in detail, the reference character 5 designates the body portion of the tool which is in the form of a bar having a curved lower end 6 and a handle portion 7. The curved lower end 6 of the body portion is bifurcated to receive the inner end of the arm 8 which is pivotally held between the furcations of the body portion, by means of the bolt 9.

Teeth 10 are formed along the upper edge of the arm 8 and are designed to cooperate with the free end of the bar 11 that is pivotally connected with the bar forming the body portion. Teeth 12 are formed along the lower edge of the bar 8 and are designed to cooperate with the inwardly extended end portion 13 of the arm 11, to hold the tool against movement after it has been positioned on a rim, and operated to contract the rim on which the tool is mounted. When the free end of the bar 11 moves into engagement with the teeth 10, the tool is held against movement when the tool has been operated to expand the rim.

Formed integral with the body portion 5 are enlargements 14 which are curved, as clearly shown by Figure 3 of the drawing, the enlargements being formed with a bore to receive the bolt 15 which is provided with a head at one end and a threaded opposite end to receive the nut 16. Rim engaging arms 17 cooperate with the arm 8 in contracting or expanding a rim, and these arms 17 include enlargements 18 at their inner ends, which enlargements are formed with curved openings curved to conform to the shapes of the enlargements 14, so that the arms 17 may move freely on the enlargements.

Openings 19 are formed in the enlargements, and are substantially large as compared with the ends of the enlargements 14, so that the arms 17 may swing laterally to properly grip the tire rim. It will also be seen that due to this construction, when pressure is applied to the handle 7 of the body portion, the arms 17, if not properly positioned, may move laterally over the curved surface of the rim, and automatically assume their proper operating positions.

The enlargements 18 are formed with spaced ribs 21 that engage the body portion of the tool, when the tool is in operation as a rib expander or contractor. These ribs are so spaced apart that when the device is folded into a small and compact article for storing, the ribs 21 will move to positions on opposite sides of the body portion 5 to hold the arms 17 against movement transversely of the body portion.

The arms 8 and 17 are provided with hooks 20 formed at their outer ends, which hooks are so constructed that they will fit over a tire rim in such a way as to insure against slipping of the arms from the rim, when pressure is brought to bear on the arms to contract or expand the rim.

In the use of the device as a rim contractor, the hooked end portion of the arm 8 is positioned over the rim, while the hooked end portions of the arms 17 are hooked over the rim at points adjacent to the split of the rim. The lever is now swung in the direction of the arm 8, moving the arms 8 and 17, towards each other and breaking the rim. The lock bar 11 is now positioned under the bar 8 to engage with the teeth 12, whereupon the tool is held in its contracted position.

I claim:

1. In a rim tool, a main bar, an arm pivotally connected with the main bar, a bolt extending through the main bar, enlarged bearing members on the main bar and through which the bolt extends, arms having enlarged openings, mounted on the enlarged bearing members, spaced ribs on the arms and adapted to engage opposite sides of the main bar to hold the arms against lateral movement when the arms are in their folded positions.

2. In a rim tool, a main bar, an arm pivotally connected with the main bar, said main bar having enlarged lateral extensions having rounded surfaces, arms having enlargements at one of their respective ends, the enlargements having circular openings to receive the enlarged lateral extensions, said openings being of greater diameters than the enlarged lateral extensions, a bolt extending through the lateral extensions and openings to secure the arms to the main bar, and means on the arms for engaging the main bar to hold the arms against lateral movement when the tool is in its folded position.

In testimony that I claim the foregoing as my own, I have hereto affixed my signature.

JOHN H. HUFFMAN.